(12) United States Patent
Beier et al.

(10) Patent No.: US 10,120,137 B2
(45) Date of Patent: Nov. 6, 2018

(54) OPTICAL ADAPTOR FOR MOUNTING TO A RECEPTACLE TO OPTICALLY COUPLE CONNECTORIZED OPTICAL CABLES

(71) Applicant: CORNING OPTICAL COMMUNICATIONS LLC, Hickory, NC (US)

(72) Inventors: Joachim Rudolf Beier, Munich (DE); Wolf Peter Kluwe, Hagen (DE); Jürgen Matthies, Wetter (DE); Gordon Mueller-Schlomka, Berlin (DE); Martin Schulte, Wildau (DE); Michael Wimmer, Berlin (DE)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/435,520

(22) Filed: Feb. 17, 2017

(65) Prior Publication Data

US 2017/0160476 A1    Jun. 8, 2017

Related U.S. Application Data

(63) Continuation of application No. PCT/US2015/047869, filed on Sep. 1, 2015.

(30) Foreign Application Priority Data

Sep. 4, 2014  (EP) ..................................... 14183585

(51) Int. Cl.
*G02B 6/38* (2006.01)

(52) U.S. Cl.
CPC .......... *G02B 6/3825* (2013.01); *G02B 6/387* (2013.01); *G02B 6/3821* (2013.01); *G02B 6/3874* (2013.01); *G02B 6/3893* (2013.01)

(58) Field of Classification Search
None
See application file for complete search history.

(56) References Cited

U.S. PATENT DOCUMENTS

| 5,274,729 A | 12/1993 | King et al. |
| 5,297,227 A | 3/1994 | Brown et al. |
| (Continued) | | |

FOREIGN PATENT DOCUMENTS

| CN | 102868447 A | 1/2013 |
| EP | 0967497 A1 | 12/1999 |
| (Continued) | | |

OTHER PUBLICATIONS

Patent Cooperation Treaty, International Search Report and Written Opinion for PCT/US15/47869, dated Jan. 5, 2016, 11 pages.

(Continued)

*Primary Examiner* — Sung Pak
(74) *Attorney, Agent, or Firm* — Michael E. Carroll, Jr.

(57) ABSTRACT

An optical adaptor for mounting to a receptacle to optically couple connectorized optical cables comprises an assembly of an optical interface to provide an optical path between a first and a second one of the connectorized optical cables to optically couple the first and the second connectorized optical cable. The optical adaptor further comprises a mounting element formed as a hollow body to mount the assembly of the optical interface. The assembly of the optical interface is configured to be insertable in the hollow body of the mounting element. The mounting element is configured to mechanically couple the first connectorized optical cable to the mounting element so that the first connectorized optical cable is optically coupled to the optical path.

13 Claims, 9 Drawing Sheets

(56) References Cited

U.S. PATENT DOCUMENTS

| | | | |
|---|---|---|---|
| 5,537,501 A | 7/1996 | Iwano et al. | |
| 6,102,581 A | 8/2000 | Deveau et al. | |
| 6,149,315 A | 11/2000 | Stephenson | |
| 6,341,191 B1 | 1/2002 | Takahashi | |
| 6,579,014 B2 | 6/2003 | Melton et al. | |
| 6,648,520 B2 | 11/2003 | McDonald et al. | |
| 6,802,653 B2 | 10/2004 | Deane | |
| 6,863,446 B2 * | 3/2005 | Ngo | G02B 6/3825 385/56 |
| 7,163,342 B2 * | 1/2007 | Robertson | G02B 6/3869 385/53 |
| 7,182,524 B2 * | 2/2007 | Kramer | G02B 6/3825 385/53 |
| 7,614,797 B2 | 11/2009 | Lu et al. | |
| 7,686,519 B2 | 3/2010 | Lu | |
| 8,480,310 B2 | 7/2013 | Kewitsch | |
| 8,864,389 B2 | 10/2014 | Lin | |
| 9,400,357 B2 * | 7/2016 | Kato | G02B 6/3897 |
| 9,606,299 B2 * | 3/2017 | Van Baelen | G02B 6/3893 |
| 2003/0095779 A1 | 5/2003 | Chang | |
| 2006/0088248 A1 | 4/2006 | Tran et al. | |
| 2009/0003772 A1 | 1/2009 | Lu et al. | |
| 2009/0282214 A1 | 11/2009 | Kuesel et al. | |
| 2012/0263419 A1 | 10/2012 | Briggs et al. | |
| 2014/0044394 A1 | 2/2014 | Lin | |
| 2014/0133804 A1 | 5/2014 | Lu et al. | |
| 2016/0139343 A1 | 5/2016 | Dean, Jr. et al. | |

FOREIGN PATENT DOCUMENTS

| | | |
|---|---|---|
| JP | 2006258861 A | 9/2006 |
| JP | 2009103837 A | 5/2009 |
| WO | 2015197588 A1 | 12/2015 |

OTHER PUBLICATIONS

Patent Cooperation Treaty, International Search Report and Written Opinion for PCT/US2015/047868, dated Jan. 7, 2016, 11 pages.

Patent Cooperation Treaty, International Search Report and Written Opinion for PCT/US2015/047872, dated Dec. 21, 2015, 10 pages.

Patent Cooperation Treaty, International Search Report and Written Opinion for PCT/US2015/059430, dated Jun. 1, 2016, 15 pages.

Commscope, "Hardened Drop Cable and Connector Solultions," http://wvvw.commscope.com/Docs/Hardened-Drop-Cable-and-Connector-Solutions-311638BE.pdf, 4 pages.

\* cited by examiner

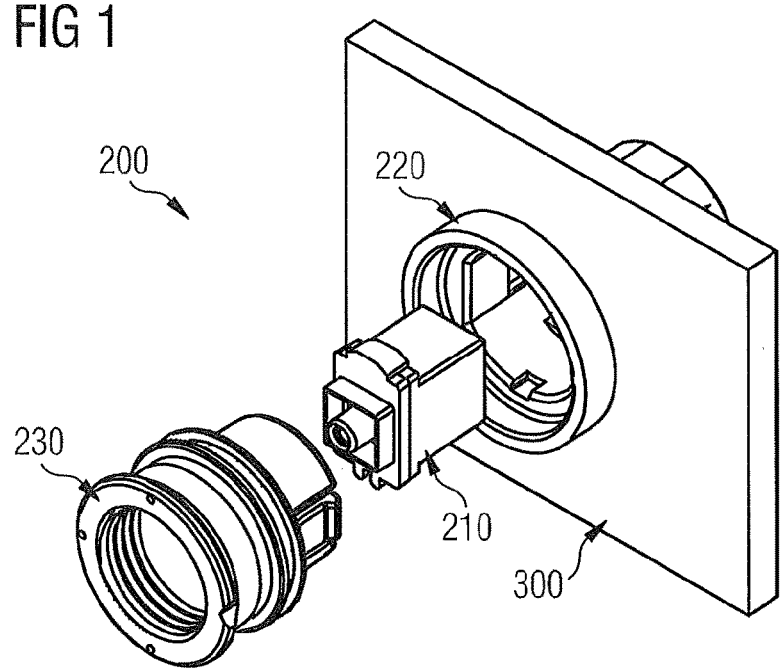
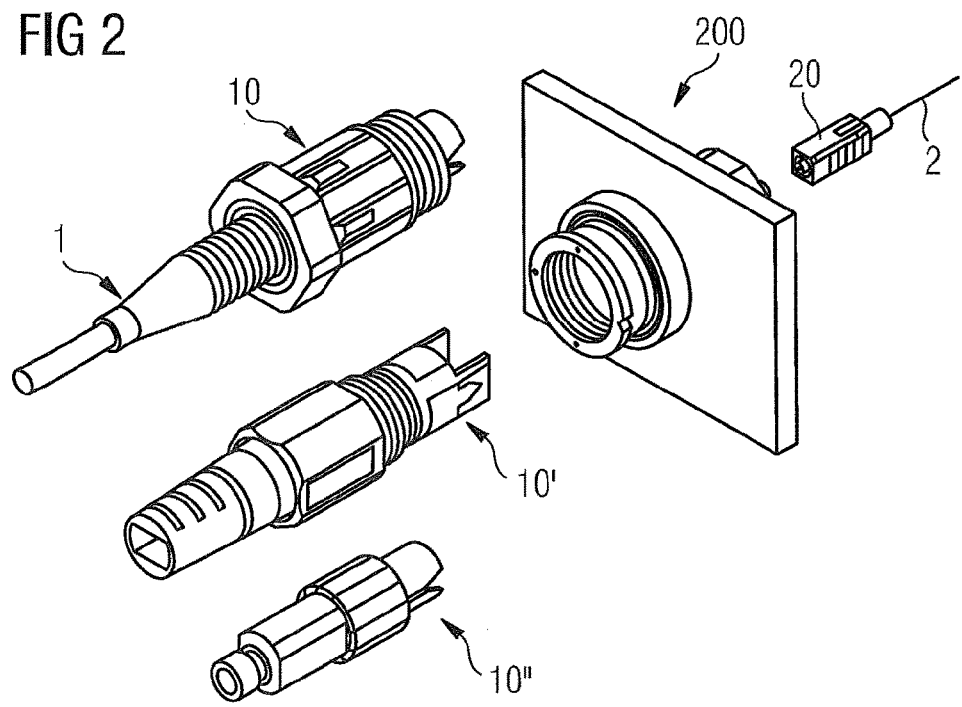

OPTICAL ADAPTOR FOR MOUNTING TO A RECEPTACLE TO OPTICALLY COUPLE CONNECTORIZED OPTICAL CABLES

CROSS-REFERENCE TO RELATED APPLICATIONS

This application is a continuation of International Application No. PCT/US2015/47869, filed on Sep. 1, 2015, which claims the benefit of priority under 35 U.S.C. § 119 of European Patent Application Serial No. 14183585.0, filed on Sep. 4, 2014, the content of which is relied upon and incorporated herein by reference in their entirety.

FIELD

The present application relates to an optical adaptor for mounting to a receptacle to optically couple connectorized cables. Connectorized cables include, for example, cables with connectors installed on them in the field, and cables with connectors installed on them in the factory being preconnectorized optical cables. Such connectorized optical cables respectively comprise at least one optical fiber which is to optically connect to each other. The application further relates to an optical assembly to optically couple connectorized cables, for example, preconnectorized optical cables to each other.

BACKGROUND

Optical cables, such as fiber optic drop cables, are capable of transmitting an extremely large amount of bandwidth compared with copper cables. The development in communication networks tends to bring optical cables closer to subscribers to have access to the increased bandwidth. However, there are certain obstacles that make it challenging and/or expensive to route optical cables deeper into the communication network, i.e. closer to a subscriber.

For instance, making a suitable optical connection between optical waveguides is much more difficult than making an electrical connection between copper wires. This is because optical connections require special tools and equipment, highly trained craftsmen, along with precision components. Additionally, as the communication network pushes towards subscribers, the communication network requires more connections, which compounds the difficulties of providing optical waveguides to the premises of the subscriber.

In order to couple generic cables having a simple structure, for example copper cables, the ends of the cables may be terminated by suitable pairs of connectors such as complementary shaped connectors. In order to ensure the coupling of light between fiber optic cables with low attenuation, the ends of the optical fibers to be coupled have to be precisely aligned.

A precise alignment of optical fibers to be connected to each other may be ensured by using a receptacle/an optical port being adjusted to receive the optical connectors respectively terminating each of the optical cables in order to guarantee a precise coupling of the optical fibers included in the optical cables. In order to couple a first and a second cable with connectors on them, for example, preconnectorized optical cable, a first optical connector terminating the first optical cable may be inserted in the receptacle at a first side of the receptacle, and a second optical connector terminating the second optical cable may be inserted in the receptacle at a second side of the receptacle.

The receptacle provides at least a mounting function for the optical connectors terminating the optical cables. The receptacle may also provide a mechanical coupling function for the optical connectors and an optical coupling function for the optical fibers of the optical cables. In order to provide the mechanical and optical coupling function the receptacle may comprise a coupling element. The coupling element is usually configured to receive the first optical connector at a first side of the coupling element and to receive the second connector at a second side of the coupling element.

The receptacle is usually adapted to the type of optical connectors to be coupled. A receptacle may, for example, be designed by a manufacturer to couple the first optical connector of a first type to the second optical connector of the same type or a second different type. The first optical connector may be a connector made by the same manufacturer which also produces the receptacle. The second optical connector may be a connector of an industrial standard. Several industrial standard connector types are available such as SC connector, ST connector and LC connector.

The precise coupling of connectorized optical cables such as preconnectorized optical cables will be challenging, if one of the optical connectors has to be replaced by an optical connector of another type and a subscriber do not wish to substitute the already pre-installed receptacle. Assuming that the exchanged first optical connector is an optical connector being produced by another manufacturer than the manufacturer of the primarily installed receptacle, the new first optical connector will not be compatible with the existing receptacle. If the exchanged optical connector has a different size and/or shape than the previously installed first optical connector which was used thitherto with the receptacle, the newly used first optical connector may often not even be inserted in the receptacle let alone optically coupled to the second optical connector. In this case, it is necessary to use an optical adaptor as an intermediate part between the new first optical connector, the receptacle and the second optical connector.

There is a need to provide an optical adaptor being mountable to a receptacle to optically couple connectorized optical cables such as preconnectorized optical cables which allows a precise alignment of the optical fibers of the connectorized optical cables. There is also a desire to provide an optical assembly to optically couple connectorized optical cables such as preconnectorized optical cables to ensure a precise alignment of the optical fibers of the connectorized optical cables.

SUMMARY

An optical adaptor for mounting to a receptacle to optically couple connectorized optical cables is specified in present claim 1.

According to an embodiment of an optical adaptor for mounting to a receptacle to optically couple connectorized optical cables, the optical adaptor comprises an assembly of an optical interface to provide an optical path between a first and a second one of the connectorized optical cables to optically couple the first and the second connectorized optical cable, wherein the assembly of the optical interface has a first side to optically couple the first connectorized optical cable to the optical path and a second side to optically couple the second connectorized optical cable to the optical path. The optical adaptor further comprises a mounting element formed as a hollow body to mount the assembly of the optical interface, the mounting element having a longitudinal axis.

The assembly of the optical interface and the mounting element are configured such that the assembly of the optical interface is insertable in the hollow body of the mounting element. The assembly of the optical interface is moveably arranged inside the hollow body of the mounting element in a direction along the longitudinal axis of the mounting element and is fixed inside the hollow body of the mounting element in relation to a rotation around the longitudinal axis of the mounting element. The mounting element is configured to mechanically couple the first connectorized optical cable to the mounting element so that the first connectorized optical cable is optically coupled to the optical path.

An assembly to optically couple connectorized optical cables is specified in claim 12.

According to an embodiment of an optical assembly to optically couple connectorized optical cables, the optical assembly comprises the optical adaptor as specified above and a coupling element being configured to mechanically couple the second optical connector to the coupling element and to optically couple the second connectorized optical cable to the assembly of the optical interface of the optical adaptor.

BRIEF DESCRIPTION OF THE DRAWINGS

FIG. 1 is a perspective view of a receptacle to couple connectorized optical cables such as preconnectorized optical cables;

FIG. 2 shows first optical connectors of a different type to be connected to a second optical connector by a receptacle;

DETAILED DESCRIPTION

Figure 3A:
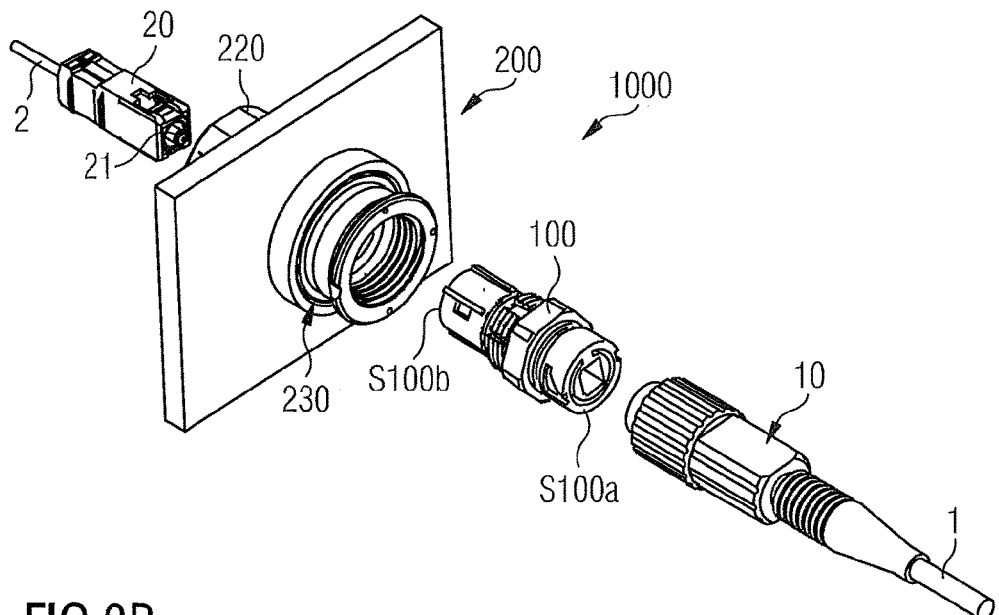
FIG. 3A shows a perspective view of a receptacle and an optical adaptor in an unmated condition to couple connectorized optical cables.

The present invention will now be described in more detail hereinafter with reference to the accompanying drawings showing embodiments of the invention. The invention may, however, be embodied in many different forms and should not be construed as limited to the embodiments set forth herein; rather, these embodiments are provided so that the disclosure will fully convey the scope of the invention to those skilled in the art. The drawings are not necessarily drawn to scale but are configured to clearly illustrate the invention.

FIG. 1 shows an embodiment of a receptacle 200 comprising a coupling element 210 to which an optical connector terminating an optical cable, for example a fiber optic drop cable, may be connected. The receptacle 200 comprises a fixture 220 arranged in a bore hole of a housing 300 such as a housing of a distribution closure. The receptacle 200 comprises a fixation adaptor 230 which may be mounted to the fixture 220 by inserting the fixation adaptor into the fixture 220. The fixation adaptor 230 may comprise snap hooks to engage the fixation adaptor 230 to the fixture 220 and to securely hold the fixation adaptor 230 inside the fixture 220. The coupling element 210 may be inserted and securely held in the fixation adaptor 230. The coupling element 210 is configured to connect a first optical connector terminating a first optical cable to a second optical connector terminating a second optical cable. The coupling element 210 is further configured to optically couple an optical fiber of the first optical cable to an optical fiber of the second optical cable.

FIG. 2 shows a connectorized optical cable such as preconnectorized optical cable 1, for example a fiber optic drop cable, which is terminated at its end by an optical connector 10 of a first type. FIG. 2 shows other optical connectors 10' and 10" being of a different second and third type. Another optical cable 2 is terminated at its end by optical connector 20 being of a fourth type. The optical connector 20 may be configured as a connector of a SC industrial standard type. The receptacle 200 comprises the coupling element 210, the fixture 220 and the fixation adaptor 230 as illustrated in FIG. 1. Several industrial standard connector types are available such as SC connector, ST connector or LC connector. These connectors are connected to the optical fiber to align it relative to a ferrule provided within the assembly. The front face of the connector is used to align the optical fiber. In the detailed embodiment, the assembly is described using an SC connector. Other connectors such as ST or LC connector may be used instead of an SC connector what requires adaption to the particular front face of the connector and the changes required are apparent to a skilled artisan. Cable 1 may be a cable with a connector installed on it. The connector may be installed in the factory being a preconnectorized optical cable. This disclosure and the described embodiments contemplate also connectorized cables with connectors installed on them in the field.

The receptacle 200 is configured to optically couple the preconnectorized optical cable 1 being terminated with the optical connector 10 to the preconnectorized optical cable 2 being terminated with the optical connector 20. In particular, the optical connector 10 may be connected to the coupling element 210 at the front side of the coupling, and the optical connector 20 may be fixed to the coupling element 210 at a rear side of the coupling element such that the optical fibers of the optical cable 1 and 2 are aligned to each other so that an optical attenuation of light coupled between the preconnectorized optical cables 1 and 2 is reduced.

Due to the required precise alignment of the optical fibers of the optical cables to be coupled to each other the receptacle 200 and particularly the coupling element 210, the fixture 220 and the fixation adapter 230 of the receptacle are usually adapted to couple specific types of optical connectors to each other. The receptacle 200 may be designed to couple the optical connector 10 of the first type to the optical connector 20 of the fourth type. However, the receptacle 200 is not configured to couple the optical connector 20 with one of the other optical connectors 10', 10" being of the second and third type.

In order to avoid a complete exchange of the receptacle 200 for coupling one of the optical connectors 10' and 10" to the optical connector 20, an optical adaptor has to be arranged between the receptacle 200 and the respective optical connector 10', 10" as an intermediate component to directly couple one of the optical connectors 10', 10" to the optical connector 20 or to couple one of the optical connectors 10', 10" to a first side of the optical adaptor and to couple the existing coupling element 210 of the receptacle 200 to a second side of the optical adaptor.

FIG. 3A shows an embodiment of an optical assembly 1000 to optically couple connectorized optical cables 1 and 2 such as preconnectorized optical cables 1 and 2. The optical assembly 1000 comprises an optical adaptor 100 which may be coupled to a receptacle 200. The optical adaptor 100 may be fixed to the receptacle 200 by screwing the optical adaptor 100 to a fixation adaptor 230 of the receptacle. An optical connector 10 terminating the optical cable 1, for example a fiber optic drop cable, may be mechanically coupled to a side S100a of the optical adaptor 100.

The receptacle 200 comprises a coupling element 210 arranged in the inside of a fixture 220 of the receptacle. The coupling element 210 is coupled to the optical adaptor 100 at the side S100b of the optical adaptor 100 when the optical adaptor is fixed to the receptacle. An optical connector 20, for example a connector of a SC type, may be coupled to the coupling element 210 which together with the optical adaptor 100 allows an optical coupling between the preconnectorized optical cables 1 and 2.

Figure 3B:
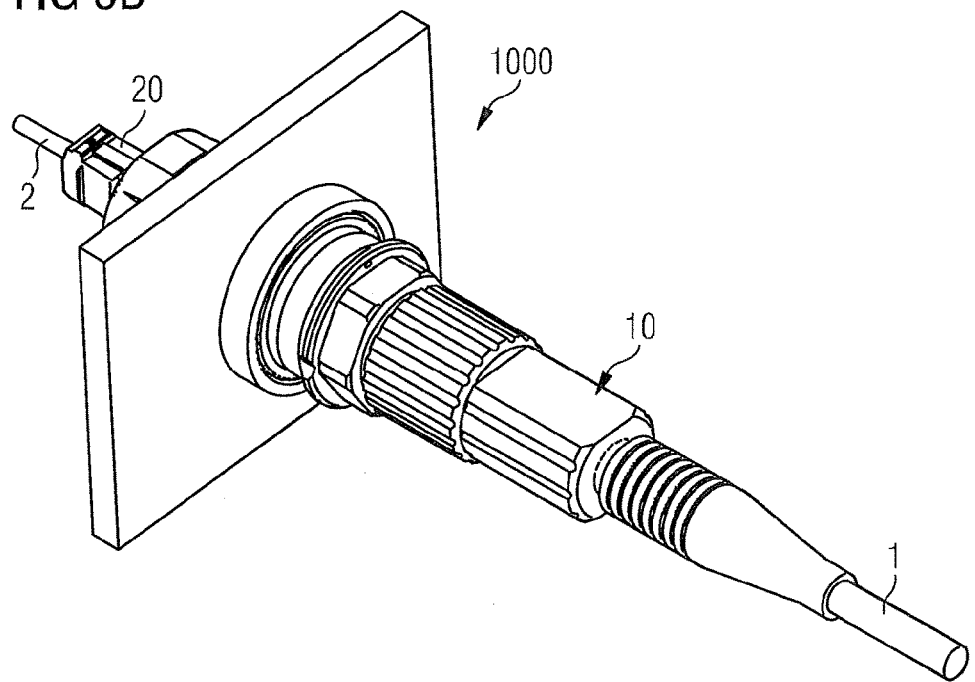
FIG. 3B shows a perspective view of connectorized optical cables being coupled to each other by an optical adaptor and a receptacle.

FIG. 3B shows the optical assembly 1000 comprising the optical adaptor 100 and the receptacle 200 in an assembled configuration. The optical connector 10 is connected at the side S100a of the optical adaptor 100 to the optical assembly 1000, and the optical connector 20 is coupled at the opposite side to the optical assembly 1000. The optical assembly 1000 allows that light may be transferred from an optical fiber of the optical cable 1 through an optical path inside the optical adaptor 100 to an optical fiber of the optical cable 2.

Figure 4A:
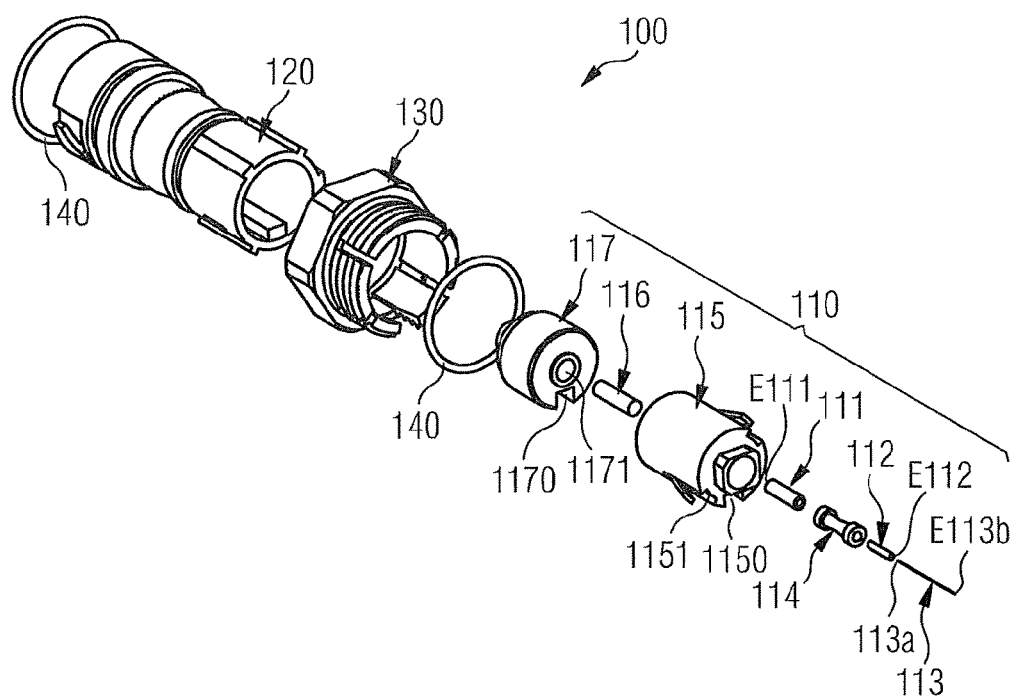
FIG. 4A shows an exploded view of an optical adaptor to couple connectorized optical cables.

FIG. 4A shows the optical adaptor 100 in an exploded view. The optical adaptor 100 comprises an assembly of an optical interface 110 to provide the optical path between the preconnectorized optical cable 1 and the preconnectorized optical cable 2 to optically couple the preconnectorized optical cables 1 and 2. The optical adaptor 100 further comprises a mounting element 120 for mounting the assembly of the optical interface 110, a screw 130 being slidable to an outer surface of the mounting element 120 and sealing elements 140.

The assembly of the optical interface 110 comprises at least one ferrule 111, 112 to provide the optical path and a connector interface 115 to receive the at least one ferrule.

The assembly of the optical interface 110 may further comprise a ferrule holder 114 for holding the at least one ferrule 111, 112. As illustrated in FIG. 4A, the assembly of the optical interface 110 may further comprise a sleeve 116 and a sleeve holder 117 to hold the sleeve 116. The sleeve 116 is configured to receive an end E111 of the at least one ferrule and a ferrule of the preconnectorized optical cable 1 as shown below. The sleeve 116 may be arranged in an end-to end hole 1171 of the sleeve holder 117, wherein the hole 1171 is centrally arranged in the body of the sleeve holder 117. The connector interface 115 may comprise an end-to-end hole 1151 in which the at least one ferrule 111, 112 and the ferrule holder 114 are arranged. The connector interface 115 and the sleeve holder 117 may be mechanically coupled to each other.

According to an embodiment of the optical adaptor 100 shown in FIG. 4A, the assembly of the optical interface 110 comprises two ferrules 111, 112 and an optical fiber 113 having a section 113a and a section 113b. The two ferrules 111, 112 and the optical fiber 113 provide the optical path of the optical adaptor 100. The section 113a of the optical fiber 113 is encapsulated by the ferrule 111 and the section 113b of the optical fiber 113 is encapsulated by the ferrule 112. An end E113a of the optical fiber 113 terminates at an end E111 of the ferrule 111, and an end E113b of the optical fiber 113 opposite to the end E113a terminates at an end E112 of the ferrule 112.

The end E111 of the ferrule 111 and the end E113a of the optical fiber 113 are configured to optically couple light between the optical fiber 113 and the preconnectorized optical cable 10. The end E112 of the ferrule 112 and the end E113b of the optical fiber 113 are configured to optically couple light between the optical fiber 113 and the preconnectorized optical cable 20. The respective ends of the ferrules 111, 112 and the optical fiber 113 may be configured as angled physical contacts.

Figure 4B:
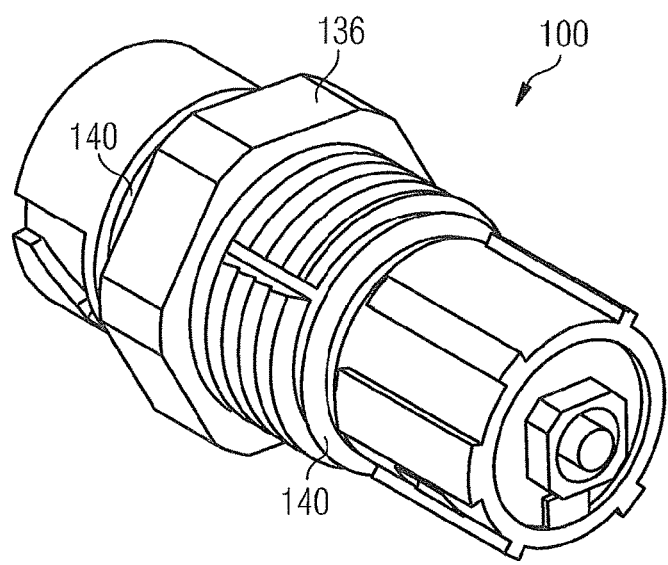
FIG. 4B shows a perspective view of an assembled optical adaptor to connect connectorized optical cables.

FIG. 4B shows the optical adaptor 100 comprising the assembly of the optical interface 110, the mounting element 120, the screw 130 and the sealing elements 140 in an assembled manner. The screw 130 is configured as a hollow screw and is arranged between the sealing elements 140 on the outer surface of the optical adaptor. The sealing elements may be configured as O-rings.

Figure 5A:
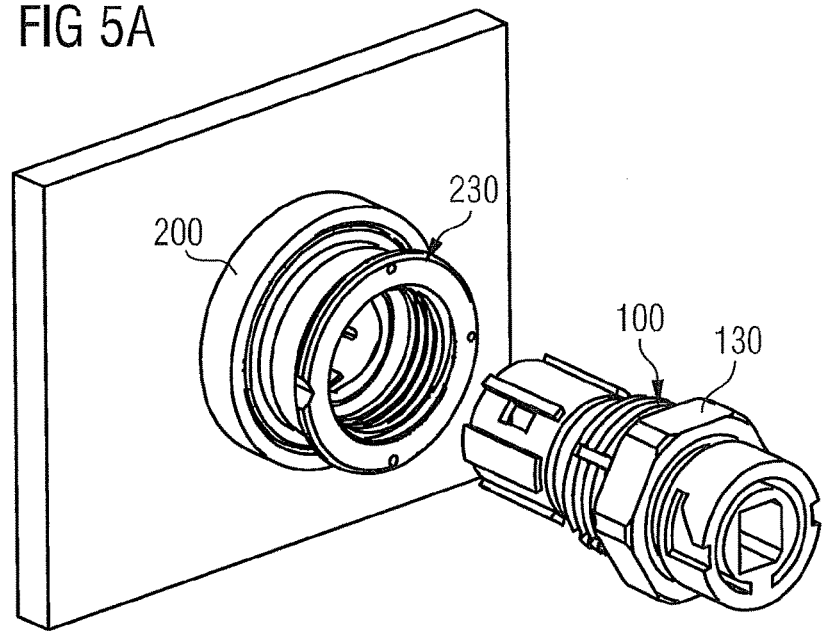
FIG. 5A shows a perspective view of an optical adaptor and a receptacle to connect connectorized optical cables in an unmated configuration.
Figure 5B:
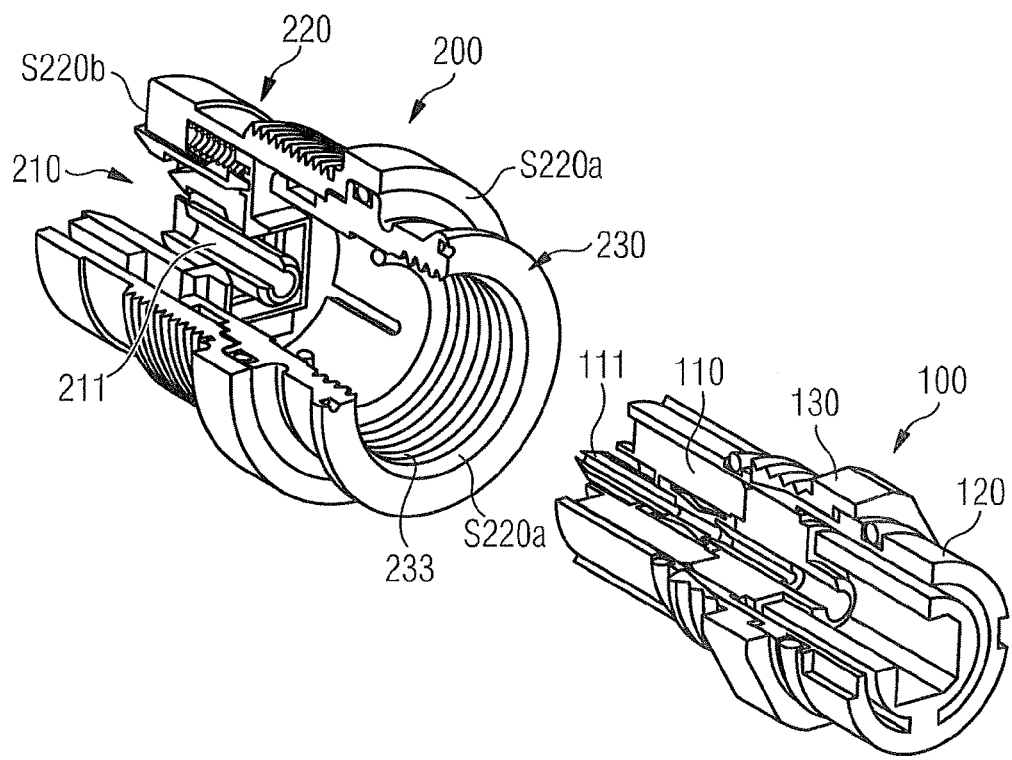
FIG. 5B shows a perspective sectional view of an optical adaptor and a receptacle to connect connectorized optical cables.

FIG. 5A shows the optical adaptor 100 in the assembled configuration as shown in FIG. 4B and the receptacle 200 before mounting the optical adaptor to the receptacle. FIG. 5B shows the optical adaptor 100 and the receptacle 200 in a perspective sectional view. The assembly of the optical interface 110 is arranged in the hollow body of the mounting element 120. The fixation adaptor 230 is mounted to the fixture 220 at a side S220a of the fixture 220. The coupling element 210 is inserted in the hollow body of the fixture 220 from a side S220b of the fixture 200. The coupling element 210 comprises a passageway 211 to insert the ferrule 111 of the optical adaptor and to insert a ferrule 21 of the optical connector 20 shown in FIG. 3A.

Figure 5C:
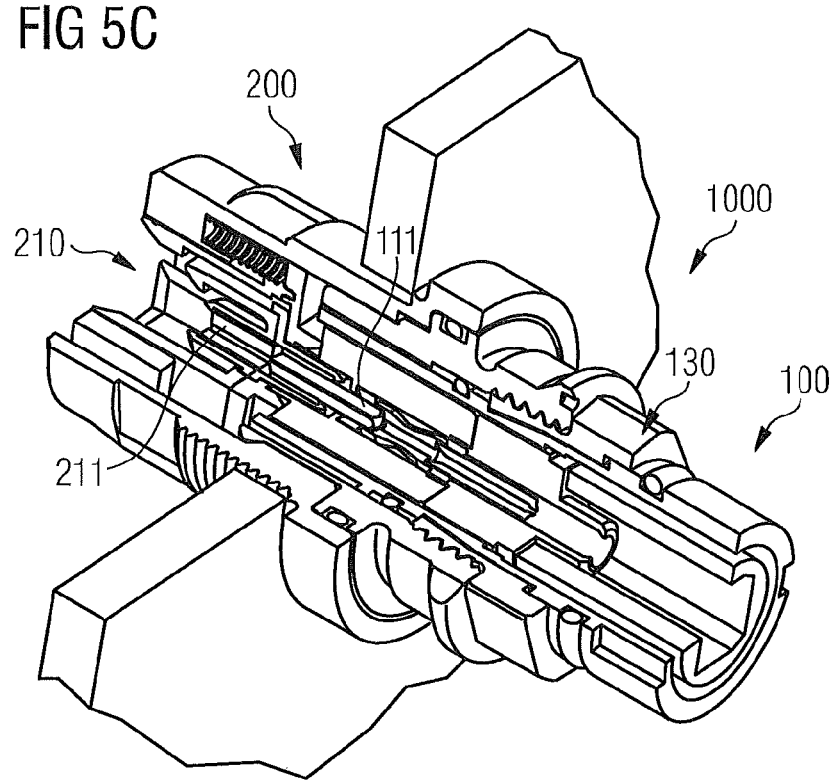
FIG. 5C shows a perspective sectional view of an optical adaptor and a receptacle in an assembled configuration.

FIG. 5C shows a perspective sectional view of the optical assembly 1000 comprising the optical adaptor 100 and the receptacle 200 in an assembled configuration. The optical adaptor 100 is mounted to the receptacle 200 by screwing the screw 130 into an inside thread 233 of the fixation adaptor 230. The sealing element 130 provides a sealing between the optical adaptor 100 and the fixation adapter 230 of the receptacle 200. As shown in FIG. 5C, the ferrule 112 of the assembly of the optical interface 110 intrudes in the passageway 211 of the coupling element 210 of the receptacle 200.

Figure 6:
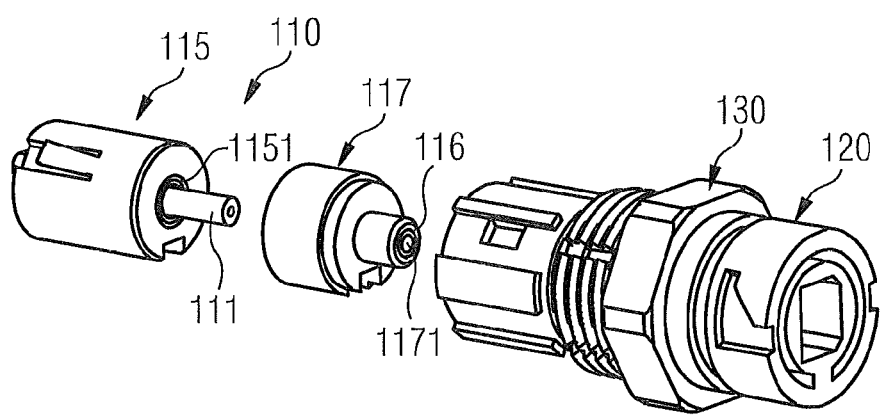
FIG. 6 is a perspective view of different components of an optical adaptor in an unmated condition.

FIG. 6 shows a perspective view of the optical adaptor 100 comprising the connector interface 115, the sleeve holder 117 and the mounting element 120 with the screw 130. The at least one ferrule 111, 112 is arranged inside the centrally arranged hole 1151 of the connector interface 115. The sleeve 116 is arranged inside the centrally arranged hole 1171 of the sleeve holder 117.

Figure 7A:
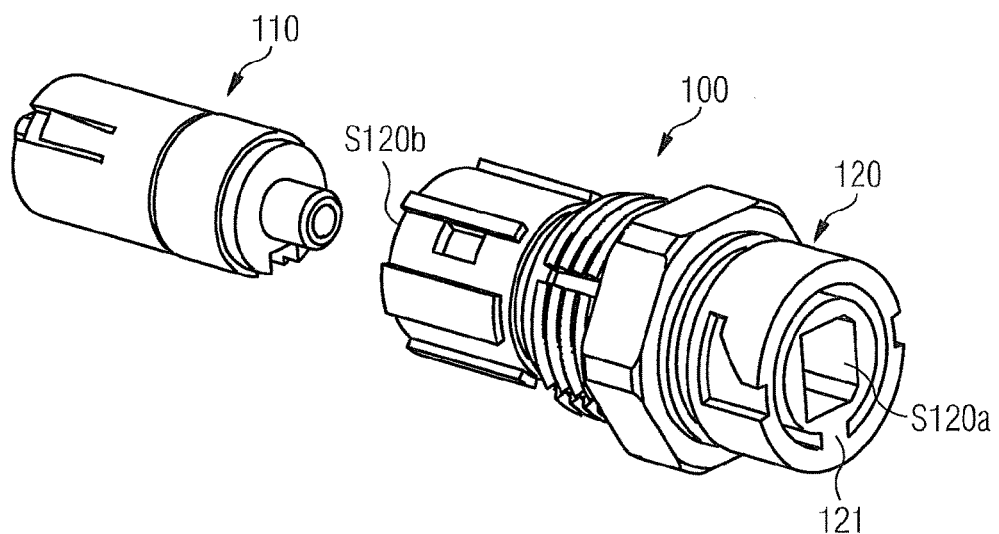
FIG. 7A is a perspective view of different components of an optical adaptor in partly mated condition from a first side of view.

FIG. 7A shows a perspective view of the optical adaptor 100 in a partly pre-assembled configuration. The connector interface 115 and the sleeve holder 117 are mechanically coupled to each other so that the ferrule 111 which protrudes out of the hole 1151 is inserted into the sleeve 116 arranged inside the hole 1171 of the sleeve holder 117.

According to an embodiment of the optical adaptor 100, the mounting element 120 has a side S120a with an opening extending in the hollow body of the mounting element 120 to receive the first optical connector 10 in the hollow body of the mounting element 120. The mounting element 120 comprises an alignment element 121 extending from the opening at the side S120a of the mounting element 120 in the hollow body of the mounting element. The alignment element 121 of the mounting element 120 is configured to engage in an alignment element of the optical connector 10 to direct the insertion of the optical connector 10 to the mounting element 120.

Figure 7B:
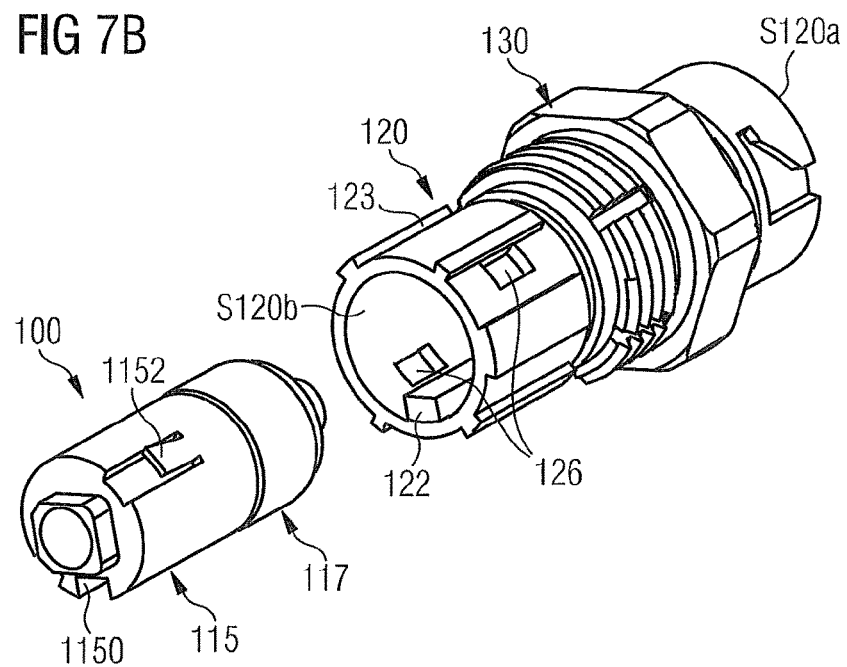
FIG. 7B is a perspective view of different components of an optical adaptor in partly mated condition from a second side of view.

FIG. 7B shows a perspective view of the optical adaptor 100 comprising the assembly of optical interface 110 and the mounting element 120 from another side than shown in FIG. 7A. The connector interface 115 comprises an alignment element 1150 and the sleeve holder 117 comprises an alignment element 1170 which is better shown in FIG. 4A. The hollow body of the mounting element 120 has a side S120b with an opening to receive the assembly of optical interface 110 comprising the connector interface 115 and the sleeve holder. The mounting element 120 comprises an alignment element 122 extending from the opening at the side S120b of the mounting element in the hollow body of the mounting element 120. The alignment element 122 of the mounting element 120 and each of the alignment elements 1150, 1170 of the connector interface 115 and the sleeve holder 117 are formed in a complementary manner to direct the insertion of the connector interface 115 and the sleeve holder 117 into the mounting element 120.

The assembly of the optical interface 110 is moveably arranged inside the hollow body of the mounting element 120 in a direction along a longitudinal axis of the hollow body of the mounting element 120. The assembly of the optical interface 110 is fixed inside the hollow body of the mounting element 120 in relation to a rotation around the longitudinal axis of the mounting element 120 by the engagement of the alignment elements 1150, 1170 into the alignment element 122 of the mounting element 120.

In order to fix the assembly of the optical interface 100 in the hollow body of the mounting element 120, the connector interface 115 and the mounting element 120 respectively comprise a latch mechanism. The latch mechanism 1152 of the connector interface 115 may be configured as a nose protruding from an outer surface of the connector interface 115. The complementary formed latch mechanism 126 of the mounting element 120 may be formed as a cavity inside the hollow body of the mounting element. When the assembly of the optical interface 110 is inserted inside the hollow body of the mounting element 120 the latch mechanism 1152 of the connector interface 115 engages in the latch mechanism 126 of the mounting element 120 so that the assembly of the optical interface 110 is fixed inside the hollow body of the mounting element 120.

For cleaning the end face E112 of the ferrule 112 and the end face E113b of the optical fiber 113 it is possible to dismantle the assembly of the optical interface 110 and the mounting element 120. The latch mechanism 1152 of the connector interface 115 and the latch mechanism 126 of the mounting element 120 allow to dismantle the inside of the mounting element. The coding by means of the alignment elements 1150, 1170 of the assembly of the optical interface 110 and the alignment element 122 of the mounting element 120 ensures the right orientation for mounting the assembly of optical interface 110 and the mounting element 120 together again.

Figure 8:
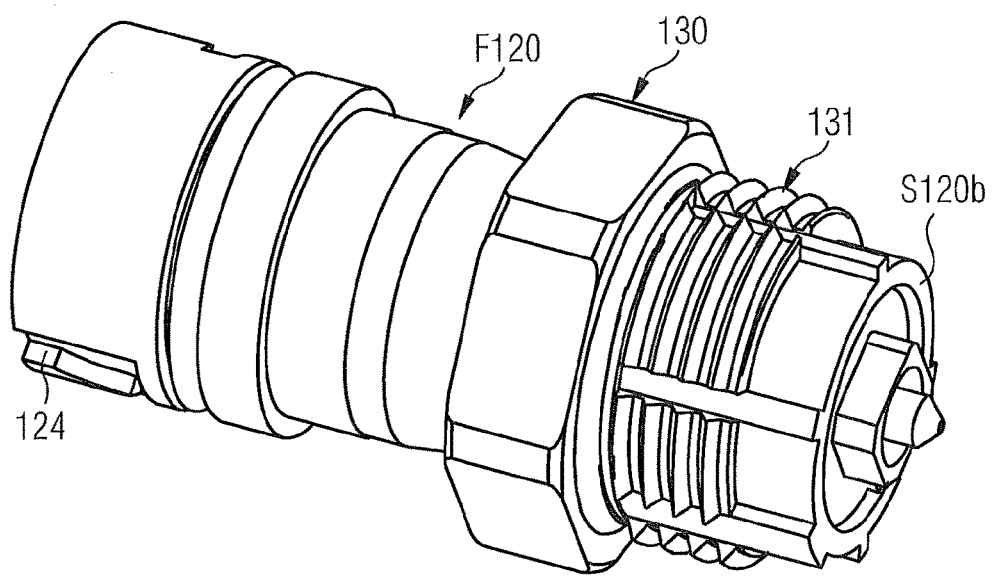
FIG. 8 is a perspective view of an optical adaptor with a screw to fix the optical adaptor to a receptacle.

FIG. 8 shows a perspective view of the optical adaptor 100 with the assembly of the optical interface 110 fixed inside the hollow body of the mounting element 120. The mounting element 120 and the hollow screw 130 are configured such that the hollow screw 130 is slidable on the mounting element 120 from the side S120b of the mounting element 120. The mounting element 120 and the hollow screw 130 are further configured such that the hollow screw 130 is rotatable on an outer surface F120 of the mounting element 120. As illustrated by the arrow in FIG. 8, mounting the screw 130 to the outer surface F120 of the mounting element 120 is only possible in one orientation.

The screw 130 is designed to fit to alignment elements 123 disposed on the outer surface F120 of the mounting element 120. As explained below, the alignment elements 123 of the mounting element 120 are configured to direct the insertion of the mounting element 120 into the receptacle 200. According to an embodiment of the optical adaptor shown in FIG. 8, the hollow screw 130 has flexible sections 131 being configured to be pressed to the outer surface F120 of the mounting element 120 when the optical adaptor is mounted to the receptacle 200 by screwing the screw 130 to the inner thread 233 of the fixation adaptor 230. The sections 131 are flexible and able to reduce its inner diameter by exerting a pressure from the outside. This pressure is applied during screwing the screw 130 into the fixation adaptor 230 of the receptacle. In the mounted condition of the screw 130 to the fixation adaptor 230, the flexible sections 131 of the screw 130 press against the outer surface F120 of the mounting element in an axial direction. According to another embodiment not shown, the screw may be split in two halves.

According to an embodiment of the optical adaptor 100, the mounting element 120 may comprise a securing means 124 being configured to mount the first optical connector 10 to the mounting element 120. The securing means 124 provides a locking and sealing mechanism to fix the first optical connector 10 to the optical adaptor 100.

Figure 9:
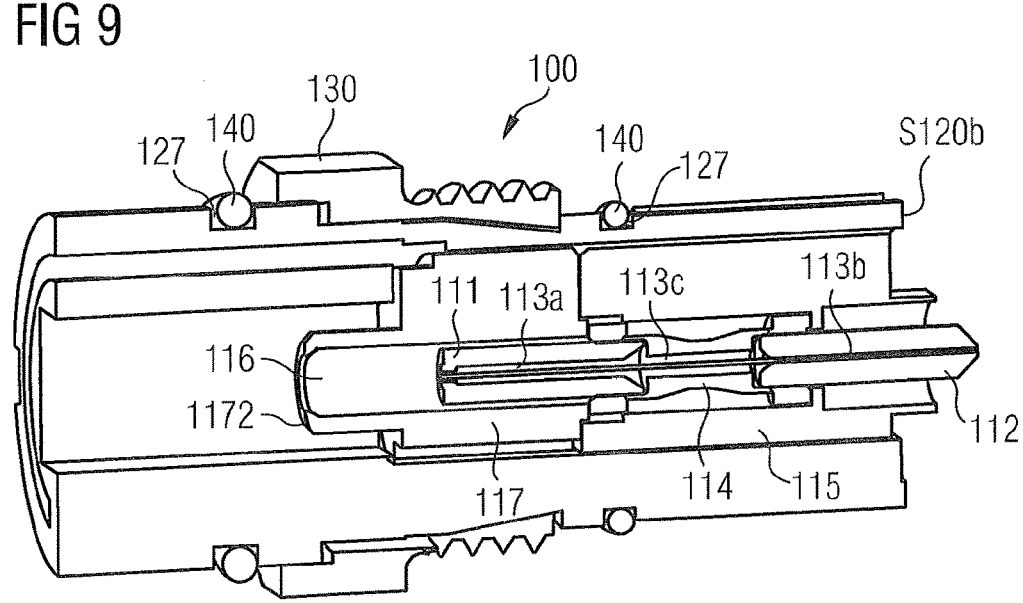
FIG. 9 is a cross-sectional view of an optical adaptor.

FIG. 9 shows a cross-sectional view of the optical adaptor 100 with the assembly of the optical interface 110 disposed in the hollow body of the mounting element 120 and the screw 130 mounted to the outer surface of the mounting element 120. The sealing elements 140 are disposed in cavities 127 in the outer surface of the mounting element 120. The assembly of the optical interface 110 comprises the ferrule holder 114 to hold the ferrules 111 and 112. The ferrule holder 114 has an end section to hold the ferrule 111 and an end section to hold the ferrule 112. A section 113c of the optical fiber 113 not encapsulated by any of the ferrules 111, 112 and located between the sections 113a, 113b of the optical fiber is guided in a passageway of the ferrule holder 114 between the end sections of the ferrule holder.

The ferrule 112 protrudes out of the hollow body of the mounting element 120 at the side S120b of the mounting element. The ferrule 111 protrudes inside the sleeve 116 arranged in the bore hole 1171 of the sleeve holder 117. The bore hole 1171 inside the sleeve holder is extended by a tube 1172 which protrudes out of the body of the sleeve holder 117. The tube 1172 is configured to insert a ferrule 11 of the optical connector 10 shown for example in FIGS. 11 and 12 to couple light in the optical path of the assembly of the optical interface 110 formed by the optical fiber 113 and the ferrules 111, 112.

Figure 10A:
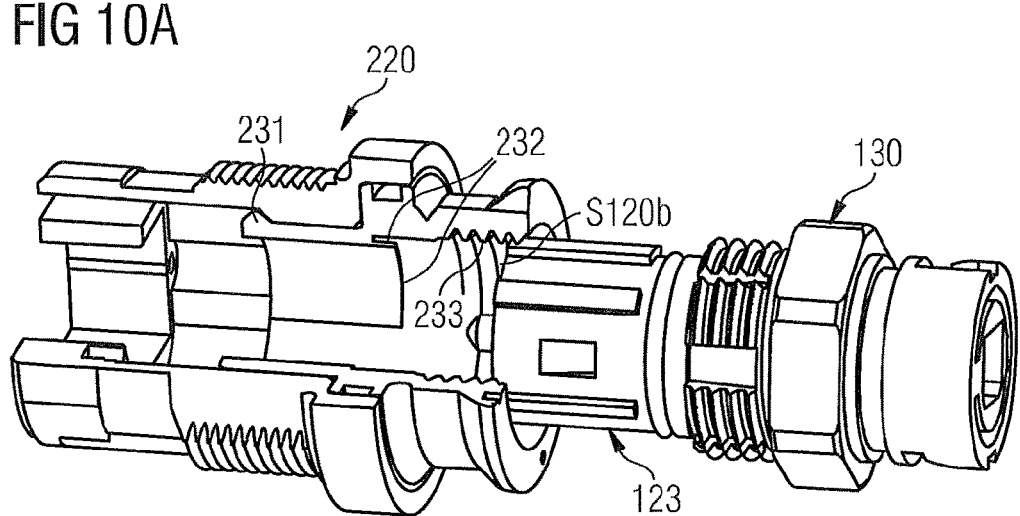
FIG. 10A is a perspective view of an optical adaptor and a receptacle before inserting the optical adaptor into the receptacle.

FIG. 10A illustrates the optical adaptor 100 and the receptacle 200 before inserting the optical adaptor 100 into the receptacle 200. The receptacle 200 comprises the fixture 220 and the fixation adaptor 230 which is mounted to the fixture 220. The optical adaptor 100 is configured to be mechanically mountable to the receptacle 200. The mounting element 120 comprises alignment elements 123 being disposed on the outer surface F120 of the mounting element 120. The alignment elements 123 are configured to engage in alignment elements 232 of the fixation adaptor 230 to direct the insertion of the mounting element 120 into the receptacle 200. The insertion of the optical adaptor 100 into the fixation adaptor 230 is only possible in one orientation due to the coding by means of the alignment elements 123 of the optical adaptor 100 and the alignment elements 232 of the fixation adaptor 230.

When the optical adaptor 100 is inserted halfway inside the hollow body of the fixation adaptor 230, the coding is checked first and the optical adaptor 100 can be rotated in the right direction by an operator. To rotate the optical adaptor 100 on one layer a flat surface of the mounting element 120 at the side S120b in combination with a coding nose 232 of the fixation adaptor 230 is required. In case of a missing nose or a missing flat surface the alignment process can fail. An operator needs to notice and to reinsert the optical adaptor. This failure is avoided by the combination of the two features, i.e. the flat surface of the mounting element 120 at the side S120b of the mounting element and the coding nose 232 of the fixation adaptor 230. After having inserted the optical adaptor 100 into the hollow body of the fixation adaptor 230, the screw 130 of the optical adaptor 100 can be screwed to the inside thread 233 of the fixation adaptor 230 to fix the optical adaptor 100 to the receptacle 200.

Figure 10B:
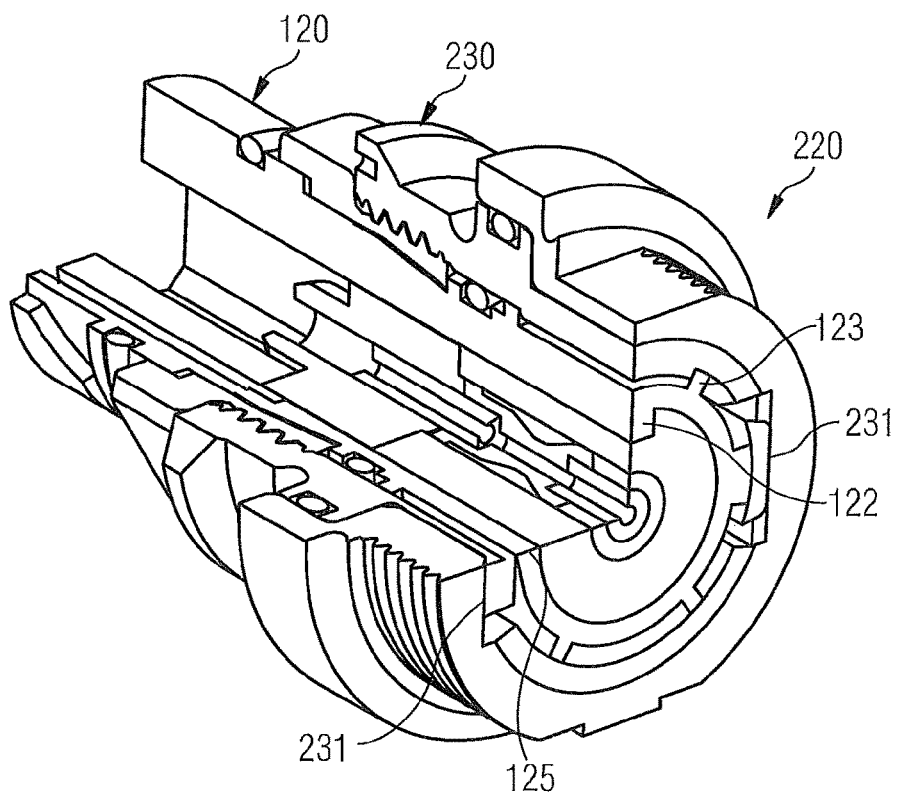
FIG. 10B is a perspective sectional view of an optical adaptor and a receptacle in an assembled configuration.

FIG. 10B shows a perspective sectional view of the optical assembly 1000 comprising the optical adaptor 100 inserted the receptacle 200. As shown in FIG. 10A, the fixation adaptor 230 comprises at least one fixing element 231 which may be formed as a snap hook to fix the fixation adaptor 230 to the fixture 220 of the receptacle 200. The mounting element 120 may comprise at least an abutment element 125 which may be formed as a protrusion arranged on the outer surface of the mounting element 120. The abutment element 125 is configured to engage the at least one snap hook 231 to the fixture 220 to fix the fixation adaptor 230 to the fixture 220 when the mounting element 120 is completely inserted in the fixation adaptor 230. The abutment element 125 enables that the snap hook 231 is locked in an engagement area of the fixture 220 so that the fixation adaptor is fixed to the fixture.

Figure 11:
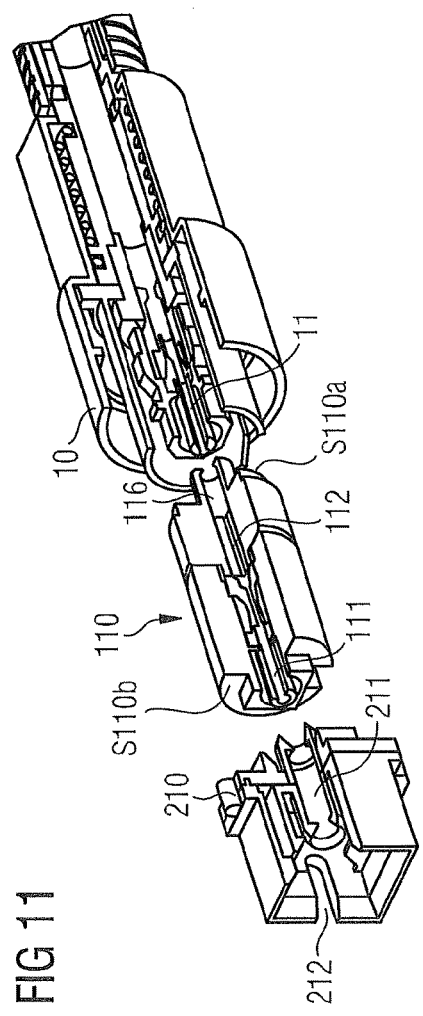
FIG. 11 is a perspective sectional view of an assembly of an optical interface, an optical coupling element and an optical connector.

FIG. 11 shows a perspective view of the optical connector 1, the assembly of the optical interface 110 and the coupling element 210 in a sectional view. The coupling element 210 is configured to mechanically couple the optical connector 20 to the receptacle 200. The coupling element 210 comprises an alignment element 212 to direct the insertion of the optical connector 20 to the coupling element 210. When the optical connector 20 is coupled to the coupling element 210, the ferrule 21 of the optical connector 20 intrudes in the passageway 211 of the coupling element. In the assembled configuration of the optical assembly 1000 the passageway 211 is aligned such that the ferrule 21 of the optical cable 20 is optically coupled to the ferrule 112 of the optical path. When the optical connector 10 is coupled to the mounting element 120, the ferrule 11 of the optical connector 10 intrudes in the sleeve 116 of the optical adaptor and is optically coupled to the ferrule 111 of the optical path.

Figure 12:
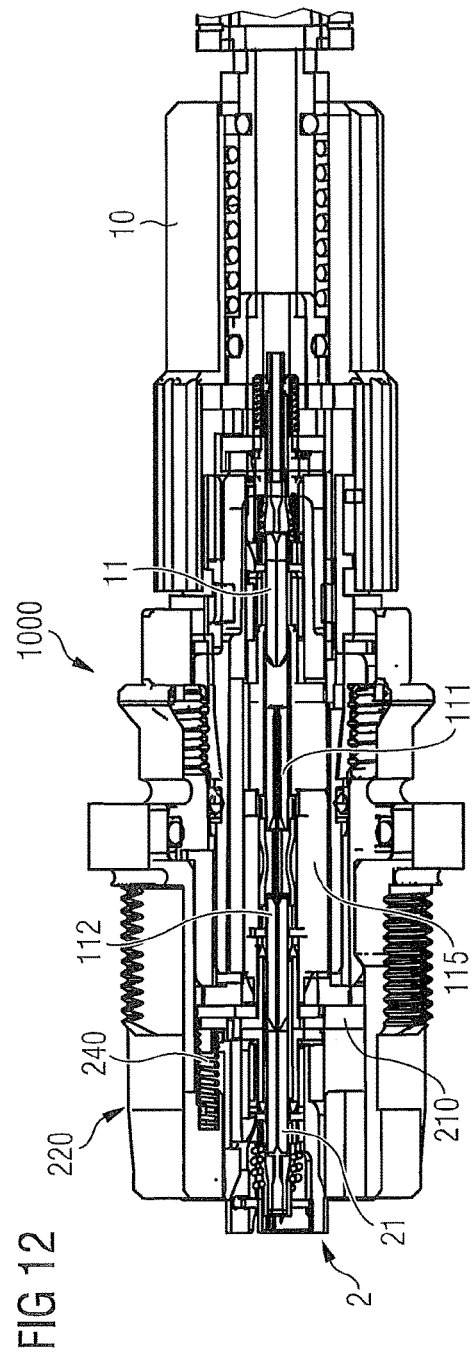
FIG. 12 is a perspective sectional view of an optical assembly to couple connectorized optical cables.

FIG. 12 shows a cross-sectional view of the optical assembly 1000 and the optical connectors 10 and 20 fixed to the optical assembly. The optical fiber of the optical cable 1 is optically coupled to the optical fiber of the optical cable 2 by the optical path of the optical assembly. The receptacle 200 comprises at least one spring element 240 being configured to push the coupling element 210 to the connector interface 115 of the optical adaptor 100 so that the spring force of the at least one spring element 240 exerts a pressure on the ferrules 11, 111 and the ferrules 21, 112. The pressure on the ferrules is defined by the spring load. The contact pressure is applied on all of the ferrules. Additionally, a tolerance compensation of the mechanical parts may be covered by the spring elements 240 of the receptacle 200.

What is claimed is:

1. An optical adaptor for mounting to a receptacle to optically couple connectorized optical cables, comprising:
an assembly of an optical interface to provide an optical path between a first and a second one of the connectorized optical cables to optically couple the first and the second connectorized optical cable wherein the assembly of the optical interface has a first side to optically couple the first connectorized optical cable to the optical path and a second side to optically couple the second connectorized optical cable to the optical path;
a mounting element formed as a hollow body to mount the assembly of the optical interface, the mounting element having a longitudinal axis; and
wherein the assembly of the optical interface is configured to be insertable in the hollow body of the mounting element;
wherein the assembly of the optical interface is configured such that the assembly of the optical interface is moveably arranged inside the hollow body of the mounting element in a direction along the longitudinal axis of the mounting element and is fixed inside the hollow body of the mounting element in relation to a rotation around the longitudinal axis of the mounting element;
wherein the mounting element is configured to mechanically couple the first connectorized optical cable to the mounting element so that the first connectorized optical cable is optically coupled to the optical path;
wherein the assembly of the optical interface comprises at least one ferrule to provide the optical path and a connector interface to receive the at least one ferrule;
wherein the assembly of the optical interface comprises a sleeve and a sleeve holder to hold the sleeve, and the sleeve is configured to receive an end of the at least one ferrule and a ferrule of the first connectorized optical cable; and
wherein the connector interface and the sleeve holder are mechanically coupled to each other.

2. The optical adaptor of claim 1, further comprising a ferrule holder for holding the at least one ferrule.

3. The optical adaptor of claim 1, wherein the assembly of the optical interface comprises two ferrules and an optical fiber having a first and a second section, the two ferrules and the optical fiber providing the optical path;
  wherein the first section of the optical fiber is encapsulated by the first ferrule and the second section of the optical fiber is encapsulated by the second ferrule;
  wherein a first end of the optical fiber terminates at an end of the first ferrule and a second end of the optical fiber opposite to the first end terminates at an end of the second ferrule;
  wherein the end of the first ferrule and the first end of the optical fiber are configured to optically couple light between the optical fiber and the first connectorized optical cable; and
  wherein the end of the second ferrule and the second end of the optical fiber are configured to optically couple light between the optical fiber and the second connectorized optical cable.

4. The optical adaptor of claim 1, wherein the mounting element has a first side with an opening extending in the hollow body of the mounting element to receive the first optical connector in the hollow body;
  wherein the mounting element comprises a first alignment element extending from the opening at the first side of the mounting element in the hollow body of the mounting element; and
  wherein the first alignment element of the mounting element is configured to engage in an alignment element of the first optical connector to direct the insertion of the first optical connector to the mounting element.

5. The optical adaptor of claim 4, wherein each of the connector interface and the sleeve holder comprises an alignment element;
  wherein the hollow body of the mounting element has a second side with an opening to receive the connector interface and the sleeve holder in the hollow body of the mounting element;
  wherein the mounting element comprises a second alignment element extending from the opening at the second side of the mounting element in the hollow body of the mounting element; and
  wherein the second alignment element of the mounting element and each of the alignment element of the connector interface and the sleeve holder are formed in a complementary manner to direct the insertion of the connector interface and the sleeve holder into the mounting element.

6. The optical adaptor of claim 5, wherein the optical adaptor is configured to be mechanically mountable to a fixture of the receptacle to hold the optical adaptor;
  wherein the mounting element comprises a third alignment element being disposed on an outer surface of the mounting element; and
  wherein the third alignment element is configured to direct the insertion of the mounting element into the fixture.

7. The optical adaptor of claim 6, comprising:
  a hollow screw to mount the optical adaptor to the fixture; and
  wherein the mounting element and the hollow screw are configured such that the hollow screw is slideable on the mounting element from the second side of the mounting element and is rotatable on the outer surface of the mounting element.

8. The optical adaptor of claim 7, wherein the hollow screw has flexible sections being configured to be pressed to the mounting element when the optical adaptor is mounted to the fixture.

9. The optical adaptor of claim 1, wherein the mounting element comprises a securing means being configured to mount the first optical connector to the mounting element.

10. An optical assembly to optically couple connectorized optical cables, comprising:
  the optical adaptor of claim 1,
  wherein the receptacle comprises a coupling element being configured to mechanically couple the second optical connector to the coupling element and to optically couple the second connectorized optical cable to the assembly of the optical interface of the optical adaptor.

11. The optical assembly of claim 10, wherein the receptacle comprises a fixture formed as a hollow body to receive the coupling element; and
  wherein the receptacle comprises at least one spring element of the receptacle being configured to push the coupling element to the connector interface of the optical adaptor.

12. The optical assembly of claim 11, wherein the receptacle comprises a fixation adapter being configured to be fixable to the fixture; and
  wherein the hollow screw of the optical adaptor is configured to be screwed to the fixation adapter to fix the mounting element of the optical adaptor to the fixture.

13. The optical assembly of claim 12, wherein the fixation adapter comprises at least one snap hook to fix the fixation adapter to the fixture; and
  wherein the mounting element of the optical adaptor comprises an abutment element arranged on the outer surface of the mounting element and being configured to engage the at least one snap hook to the fixture to fix the fixation adapter to the fixture when inserting the mounting element in the fixation adapter being inserted in the fixture.

* * * * *